United States Patent
Thomas

(10) Patent No.: US 11,914,543 B2
(45) Date of Patent: Feb. 27, 2024

(54) PCIE COMMUNICATIONS

(71) Applicant: Arm Limited, Cambridge (GB)

(72) Inventor: Tessil Thomas, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/543,170

(22) Filed: Dec. 6, 2021

(65) Prior Publication Data

US 2023/0176993 A1    Jun. 8, 2023

(51) Int. Cl.
| | |
|---|---|
| G06F 13/24 | (2006.01) |
| G06F 13/42 | (2006.01) |
| G06F 12/02 | (2006.01) |
| G06F 13/16 | (2006.01) |
| G06F 13/40 | (2006.01) |

(52) U.S. Cl.
CPC ...... *G06F 13/4221* (2013.01); *G06F 12/0238* (2013.01); *G06F 13/1673* (2013.01); *G06F 13/404* (2013.01); *G06F 13/4045* (2013.01)

(58) Field of Classification Search
CPC ............. G06F 13/4221; G06F 12/0238; G06F 13/1673; G06F 13/404; G06F 13/4045
See application file for complete search history.

(56) References Cited

U.S. PATENT DOCUMENTS

| | | | |
|---|---|---|---|
| 8,429,325 B1* | 4/2013 | Onufryk ............. | G06F 13/4022 710/316 |
| 2008/0189720 A1* | 8/2008 | Moertl ................. | G06F 13/102 719/314 |
| 2013/0339826 A1* | 12/2013 | Freking ................ | H04L 1/0057 714/799 |
| 2015/0293873 A1* | 10/2015 | Shao .................... | G06F 13/4221 710/314 |
| 2020/0019515 A1 | 1/2020 | Koufaty et al. | |
| 2020/0042463 A1 | 2/2020 | Thomas et al. | |
| 2022/0350755 A1* | 11/2022 | Hahn ................... | G06F 13/4295 |
| 2022/0405212 A1 | 12/2022 | Kakaiya et al. | |

OTHER PUBLICATIONS

Extended European Search Report for EP Application No. 22208012.9 dated Apr. 17, 2023, 10 pages.

* cited by examiner

*Primary Examiner* — Henry Tsai
*Assistant Examiner* — Kim T Huynh
(74) *Attorney, Agent, or Firm* — NIXON & VANDERHYE P.C.

(57) ABSTRACT

A data processing apparatus is provided, that includes communication configured for receiving, from an origin Peripheral Component Interconnect Express (PCIe) device, a translated PCIe packet comprising a destination field that comprises a physical address of a destination PCIe device. Permission circuitry transmits a permission check packet, separate to the translated PCIe packet, to a root port to determine whether the origin PCIe device has permission to access the destination PCIe device. Buffer circuitry stores the translated PCIe packet until a response to the permission check packet is received.

19 Claims, 10 Drawing Sheets

PCIE COMMUNICATIONS

TECHNICAL FIELD

The present disclosure relates to data processing.

DESCRIPTION

In a network of Peripheral Component Interconnect Express (PCIe) devices, it is usually desirable to reduce bandwidth and/or latency of communications.

SUMMARY

Viewed from a first example configuration, there is provided a data processing apparatus comprising: communication circuitry configured to receive, from an origin Peripheral Component Interconnect Express (PCIe) device, a translated PCIe packet comprising a destination field that comprises a physical address of a destination PCIe device; permission circuitry configured to transmit a permission check packet, separate to the translated PCIe packet, to a root port to determine whether the origin PCIe device has permission to access the destination PCIe device; and buffer circuitry configured to store the translated PCIe packet until a response to the permission check packet is received.

Viewed from a second example configuration, there is provided a data processing method comprising: receiving, from an origin Peripheral Component Interconnect Express (PCIe) device, a translated PCIe packet comprising a destination field that comprises a physical address of a destination PCIe device; transmitting a permission check packet, separate to the translated PCIe packet, to a root port to determine whether the origin PCIe device has permission to access the destination PCIe device; and storing the translated PCIe packet until a response to the permission check packet is received.

Viewed from a third example configuration, there is provided a non-transitory computer-readable medium to store computer-readable code for fabrication of a data processing apparatus comprising: communication circuitry configured to receive, from an origin Peripheral Component Interconnect Express (PCIe) device, a translated PCIe packet comprising a destination field that comprises a physical address of a destination PCIe device; permission circuitry configured to transmit a permission check packet, separate to the translated PCIe packet, to a root port to determine whether the origin PCIe device has permission to access the destination PCIe device; and buffer circuitry configured to store the translated PCIe packet until a response to the permission check packet is received.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
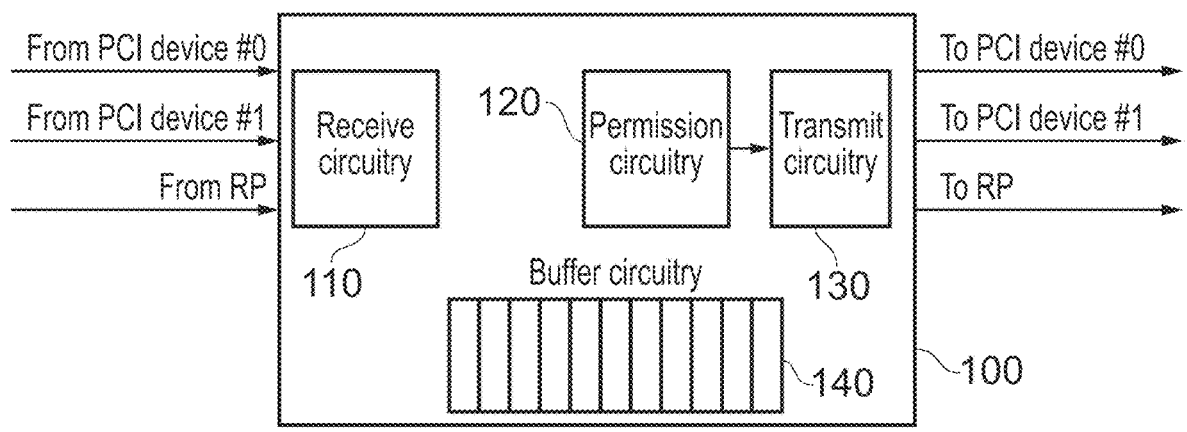
FIG. 1 shows an apparatus in accordance with some embodiments.

Before discussing the embodiments with reference to the accompanying figures, the following description of embodiments is provided.

In accordance with one example configuration there is provided a data processing apparatus comprising: communication circuitry configured to receive, from an origin Peripheral Component Interconnect Express (PCIe) device, a translated PCIe packet comprising a destination field that comprises a physical address of a destination PCIe device; permission circuitry configured to transmit a permission check packet, separate to the translated PCIe packet, to a root port to determine whether the origin PCIe device has permission to access the destination PCIe device; and buffer circuitry configured to store the translated PCIe packet until a response to the permission check packet is received.

In a PCIe network, a sending or origin PCIe device may communicate with a destination PCIe device (if, for instance, the destination PCIe device and the sending PCIe device have both been assigned to the same virtual machine). However, such communication is often only allowed under certain circumstances to prevent malicious accesses from one device to another that can result in violation of confidentiality or isolation guarantees. In such a situation, it is generally necessary for the data processing apparatus that receives the packet to determine whether the origin PCIe device is permitted to communicate with the destination PCIe device. It might be tempting to achieve this by sending the translated PCIe packet itself up to a root port to make such a determination. However, this can be bandwidth intensive since the entirety of the packet must be transmitted up to the root port and then back from the root port to the data processing apparatus. In the present example, the translated PCIe packet is held in buffer circuitry of the data processing apparatus while a permission check packet (which is different to the translated PCIe packet) is sent to the root port and a response is received. In this way, there is no need for any data in the translated PCIe packet to be transmitted to and from the root port. In this example, the PCIe packet is translated in the sense that it contains a destination field that includes a physical address of the destination PCIe device. That is that no further translation is necessitated on the packet in order to determine its destination.

In some examples, the translated PCIe packet is not transmitted to the root port. Bandwidth is therefore saved as a consequence of the data in the PCIe packet not being transmitted between the data processing apparatus and the root port.

In some examples, the permission check packet is bodyless. That is to say that the permission check packet might be a header-only packet. Consequently, the overall size of the packet is expected to be smaller than a packet that contains a body with data, and so bandwidth consumption is lower than it might otherwise be.

In some examples, the root port has access to a Memory Management Unit to determine whether the origin PCIe device has permission to access the destination PCIe device based on the physical address. A Memory Management Unit (MMU) is a device that is used to determine whether a particular device has access to a particular area of memory and can therefore be used to determine whether the origin PCIe device is able to access the destination PCIe device by assessing whether the origin PCIe device is able to access memory assigned to the destination PCIe device. The MMU might be part of the root port, or could be a separate entity that the root port is able to access. Note that the term 'permission to access' could be dependent on the type of access being requested. For instance, the origin PCIe device could have permission to issue a read request to the destination PCIe device, but not permission to issue a write request to the destination PCIe device.

In some examples, when the communication circuitry receives a response to the permission check packet: if the response indicates that the origin PCIe device has permission to access the destination PCIe device, then the buffer circuitry releases the translated PCIe packet to the destination PCIe device, otherwise an error is raised. Once a response to the permission check is received, the translated PCIe packet is able to be released to the destination PCIe device (if permission is granted) and otherwise an error is raised. The error could involve the return of the translated PCIe packet back to the origin, the transmission of an error message back to the origin PCIe device, the raising of a fault or exception, and/or the deletion of the translated PCIe packet from the buffer circuitry.

In some examples, the communication circuitry is configured, when the communication circuitry receives a completion packet from the destination PCIe device in response to the translated PCIe packet being released to the destination PCIe device, to forward the completion packet to the origin PCIe device avoiding the root port. A completion packet is typically sent in response to a read request and can contain the requested data that is the subject of the read request. In these examples, because the translated PCIe packet was sent from the origin to the destination via the data processing apparatus (without being sent via the root port) the completion packet, which takes the reverse path, also need not pass from the data processing apparatus to the root port and back again, thereby reducing bandwidth consumption and latency in the system.

In some examples, the translated PCIe packet is sent in accordance with a PCIe peer-to-peer protocol. In a PCIe peer-to-peer protocol, one PCIe device can transmit a message to another PCIe device directly (i.e. without the message being written to a main memory), which therefore improves latency.

In some examples, the communication circuitry is configured to receive, from the origin Peripheral Component Interconnect Express (PCIe) device, an untranslated PCIe packet comprising a destination field that comprises a virtual address or intermediate physical address of a destination device; and in response to the untranslated PCIe packet, the communication circuitry is configured to transmit a translation request packet for the virtual address or intermediate physical address from the root port and to transmit a second permission check packet to the root port to determine whether the origin PCIe device has permission to access the destination device. An untranslated PCIe packet is one in which the destination address is not a physical address, which is to say that the address is therefore a virtual address or an intermediate/partially translated address. In these situations, the actual destination of the untranslated PCIe packet is not known (because the physical address is not known) and so the root port is consulted in order to determine the physical address so that the untranslated PCIe packet can be routed correctly. This is achieved by the translation request packet. At the same time, a second permission check packet can be sent to determine whether the original PCIe device has permission to access the destination device as previously discussed. In practice, the translation request packet and the second permission check packet might be the same single packet.

In some examples, the communication circuitry is configured, when the untranslated PCIe packet is a read request, to transmit the translation request packet and the second permission check packet by forwarding the untranslated PCIe packet to the root port. In these examples, the untranslated PCIe packet itself serves as both the translation request packet and the second permission check packet. In particular, by forwarding the untranslated PCIe packet to the root port, the root port will attempt to determine to where the packet should be routed, simultaneously determining whether the origin can communicate to the destination. If the route happens to be via the data processing apparatus, then (if permission is granted), the packet is sent back to the data processing apparatus. This is not necessarily problematic with respect to bandwidth, since a read request tends to be small (and might even be a bodyless, header-only message). Meanwhile, latency is kept low if the device being accessed is a main memory that is accessed via the root port since the request is already at the root port.

In some examples, the data processing apparatus comprises mode circuitry to control an operating mode of the data processing apparatus between a bandwidth-saving mode and a latency-saving mode. The data processing apparatus may therefore be dynamically changeable (at runtime) as to whether bandwidth or latency is being preserved.

In some examples, the communication circuitry is configured, when the untranslated PCIe packet is a write request and the operating mode of the data processing apparatus is the latency-saving mode, to transmit the translation request packet and the second permission check packet by forwarding the untranslated PCIe packet to the root port. In the latency-saving mode of operation, the data processing apparatus aims to reduce/save latency where possible (possibly, but not necessarily, at the expense of bandwidth). Here, the write request is sent to the root port in order to obtain the permissions and translations. Consequently, when the write request is directed towards a device that is accessed via the root port (such as a main memory), the write request is already present and can be sent straight away. If the address refers to an address that is accessed via the data processing apparatus, then the write request is sent back (thereby expending bandwidth), but this does not substantially increase latency since obtaining the address translation and permission would necessitate a communication to and from the root port anyway. Consequently, while bandwidth usage might increase in some scenarios, latency is not significantly negatively affected and in some cases is improved over the bandwidth-saving mode.

In some examples, the communication circuitry is configured, when the untranslated PCIe packet is a write request and the operating mode of the data processing apparatus is the bandwidth-saving mode, to: transmit the translation request packet and the second permission check packet, both separate to the untranslated PCIe packet, to the root port to determine whether the origin PCIe device has permission to access the destination device and to obtain an a translation of the virtual address or intermediate physical address, and cause the buffer circuitry to store the untranslated PCIe packet until a response to the translation request packet and the second permission check packet is received. The bandwidth saving mode seeks to reduce/save bandwidth (possibly, but not necessarily, at the expense of latency). Here, the write request itself is buffered at the data processing apparatus and the translation request packet and the second permission check packet are sent. The translation request packet and the second permission check packet could be the same packet, different from the untranslated PCIe packet. As a consequence, the write request is not immediately sent to the root port, and so the sending of the data in the root port may be avoided in certain scenarios—thus reducing bandwidth consumption overall. However, where it becomes necessary to subsequently send the data of the write request, this can result in a higher latency due to the increased number of packets that are exchanged before the write request arrives at the root port.

In some examples, the translation request packet and the second permission check packet are bodyless. These packets therefore may only include headers and not bodies—thereby keeping bandwidth consumption low.

In some examples, when the communication circuitry receives at least one response to the translation request packet and the second permission check packet: if the at least one response indicates that the origin PCIe device has permission to access the destination device, then the buffer circuitry releases the untranslated PCIe packet to the destination device based on the translation of the virtual address or intermediate physical address, otherwise an error is raised. Thus, in response to the translation request and second permission check, if it is determined that permission is given then the untranslated PCIe packet is released to its destination (which is now known by virtue of the translation). Otherwise, an error is raised. As before, this could take the form of an error message, the return of the untranslated PCIe packet, the raising of an exception or fault, and/or the deletion of the untranslated PCIe packet from the buffer.

In some examples, when the destination device is a main memory, the buffer circuitry releases the translated PCIe packet to the root port; and when the destination device is the destination PCIe device, the buffer circuitry releases the translated PCIe packet to the destination PCIe device. Note that when the destination device is main memory, as indicated by the translated address, this involves transmitting the translation request and second permission request packets to the root port, which translates the necessary addresses and obtains permissions. A response is then sent to the data processing apparatus, which then sends the write request back to the root port. This is an increased latency that would occur if the write request was sent to the root port in the first place, but it can result in a decrease in bandwidth consumption if the resulting translated address is not in main memory (and accessed via the data processing apparatus itself rather than the root port). Therefore, in some situations, the bandwidth is reduced.

In some examples, the data processing apparatus comprises cache circuitry configured to cache the response to the permission check packet and to provide the response to the permission check when a later permission check corresponding to the permission check is to be performed. To further reduce the bandwidth and latency impact, especially for requests with untranslated address, the data processing apparatus can cache the translations and permissions that it gets from the root port and use these for checking and routing if later read or write request are to the same memory page. This would mean that round trips to the root port can be reduced or eliminated for device-to-device requests if the request hits the cache. The data processing apparatus would be authenticated (and attestation checked such that it is within the trust boundary of the VMs that uses the PCIe device functions) by the Compute SoC prior to allowing it to cache translations and permissions. The cache should be able to process invalidation requests from software. In some examples, each downstream port of the switch would have an instance of the cache. The cache can therefore store the response received from the root port regarding permissions (and translations where appropriate) so that, in the future, it may be possible to reduce instances of requests that are sent to the root port for permission/translation obtaining.

In some examples, the communication circuitry is configured to receive, from the origin Peripheral Component Interconnect Express (PCIe) device, an untranslated PCIe packet comprising a destination field that comprises a virtual address or intermediate physical address of a destination device; and the cache circuitry is configured to store a physical address corresponding to the virtual address or intermediate physical address of the destination device.

Particular embodiments will now be described with reference to the figures.

FIG. 1 shows an apparatus 100 in accordance with some embodiments. In this case, the apparatus 100 takes the form of a PCIe switch. Receive circuitry 110 is provided for receiving data in the form of packets from one or more PCIe devices and from a root port. Transmit circuitry 130 is similarly provided in order to transmit data in the form of packets to the one or more PCIe devices and to the root port. Collectively, the receive circuitry 110 and the transmit circuitry 130 form the claimed communication circuitry. Permission circuitry 120 is provided in order to cause the transmit circuitry 132 transmit a permission check to the root port. A permission check can, in some examples, be a body-less packet (e.g. only a header) that is transmitted to the root port in order to determine whether an origin PCIe device has permission to transmit a packet to a destination PCIe device. This may depend on whether the PCIe devices are assigned to the same virtual machine or not. The permission circuitry 120 could be, for instance, a general purpose processor within the PCIe switch 100.

Buffer circuitry 140 is provided in order to buffer packets that are received via the receive circuitry 110 for permission checks to be carried out. Accordingly, it is possible to reduce bandwidth consumption and/or latency experienced as a consequence of communication from PCIe devices.

Figure 2:
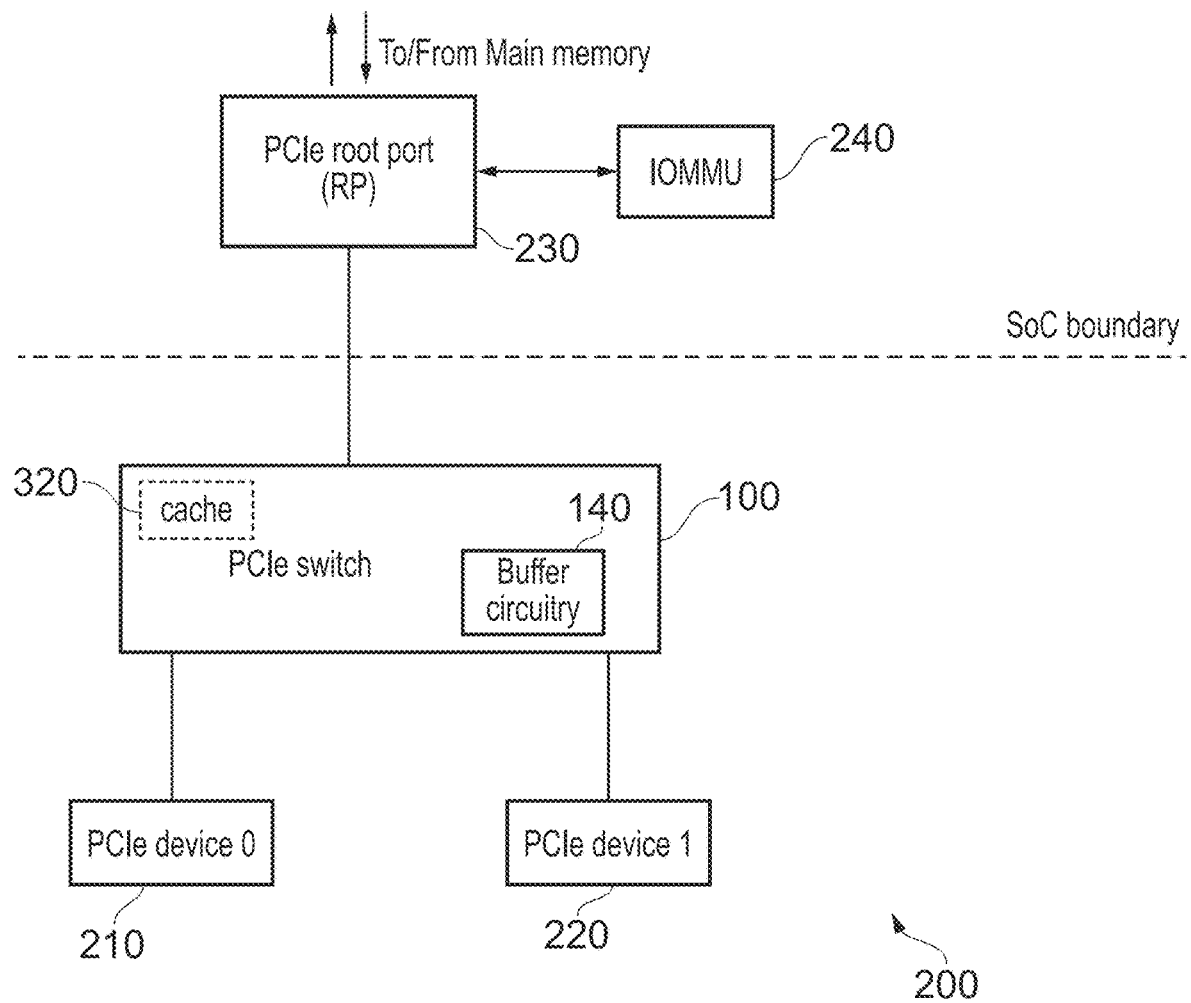
FIG. 2 illustrates an example in which the apparatus taking the form of a PCIe switch is placed in the context of a system-on-chip (SoC)

FIG. 2 illustrates an example in which the apparatus 100 taking the form of a PCIe switch is placed in the context of a system-on-chip (SoC). In this example, PCIe device 0 210 may engage in communication. The destination of the communication could be another PCIe device 1 220 (if, for instance, the two devices 210, 220 are engaging in peer-topeer communication) or could be a main memory. Communication occurs via the PCIe switch 100. A PCIe root port (RP) 230 provides access to and from the main memory. In addition, the PCIe root port 230 has access to an IOMMU 240, which is a memory management unit. The IOMMU 240 is used to perform translations between virtual/intermediate addresses and physical addresses. In addition, the IOMMU 240 also performs permission checks when accesses to memory are requested. In the case of a peer-to-peer communication, the IOMMU 240 fulfils a similar role by determining whether the origin of the transmitting message would have access to the destination of that message if the message was being transmitted via the main memory in a non-peer-to-peer fashion.

As previously explained, and as will be demonstrated in the subsequent figures, the use of buffer circuitry 140 within the PCIe switch 100 can be used in order to reduce the bandwidth and/or latency that is experienced as a consequence of access checks that are made to the IOMMU 240 via the PCIe root port 230.

In this example, the PCIe switch 100, and the PCIe devices 210, 220 form part of a single system-on-chip. Communication between devices 100, 210, 220 on a same system-on-chip are generally considered to be relatively fast in comparison to communication with devices that are off-chip such as the PCIe root port 230 and the main memory. Of course, it is possible that the system-on-chip includes the PCIe root port 230 or a similar component. However, the present techniques been described here are equally applicable to such an architecture.

The PCIe switch 100 of FIG. 2 also comprises a cache 320. This is used for storing responses received from the PCIe root port 230 so that they can be used for later requests without those later requests being forwarded to the PCIe root port 230.

Figure 3A:
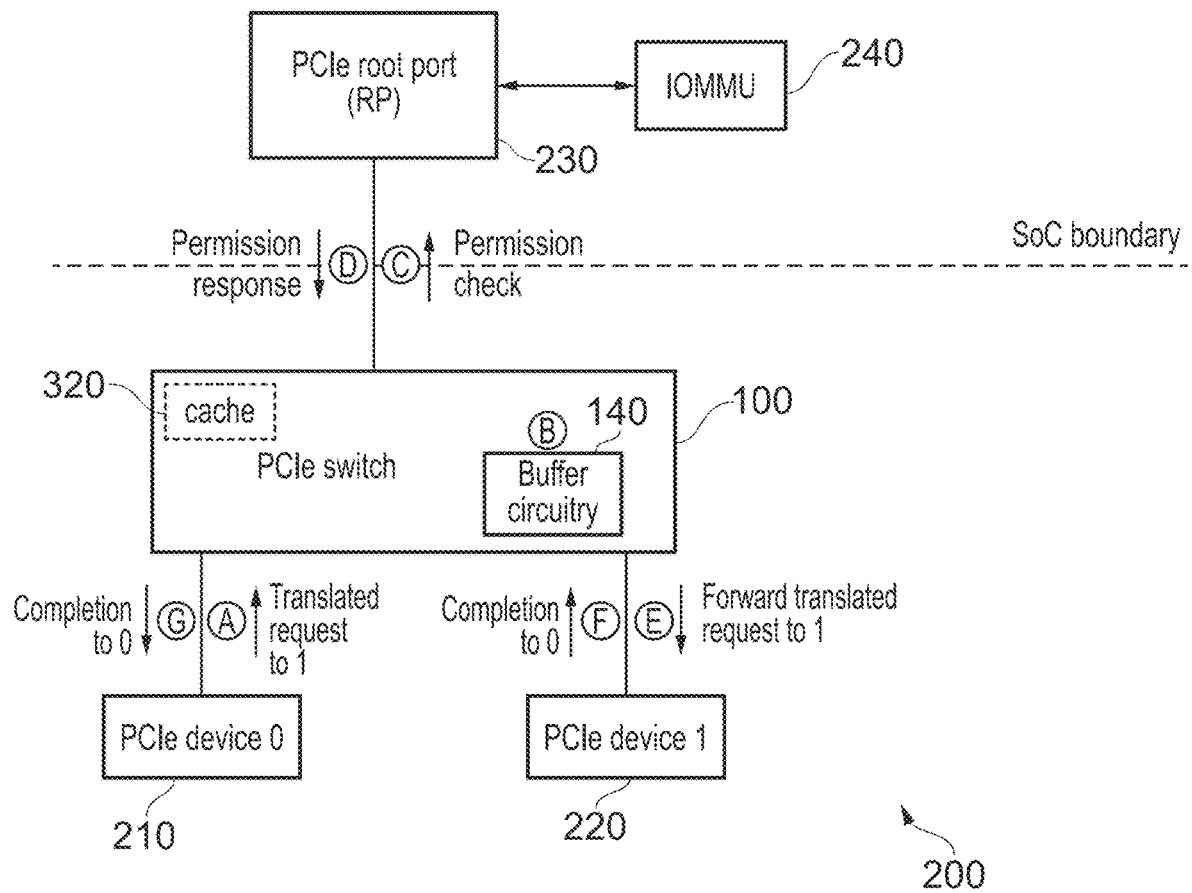
FIG. 3A illustrates an example in which one PCIe device transmits a translated request to another device in the network.

FIG. 3A illustrates an example in which PCIe device 0 210 transmits a translated request to PCIe device 1 220. The request could be a read request or a write request. The request is translated in the sense that a destination field of the request contains a physical address associated with the PCIe device 1 220. That is to say that the address within the destination field of the translated request does not itself have to be translated and the destination of the translated request packet is known to the PCIe switch 100.

At step A, the translated request is transmitted from the PCIe device 0 210 to the PCIe switch 100. At the PCIe switch 100, the receive circuitry 110 receives the translated request. Since the request is a translated request, a destination of the request is already known and it can be determined that the destination is the PCIe device 1 220. However, the PCIe switch 100 does not know whether the PCIe device 0 210 has permission to access the PCIe device 1 220.

Consequently, at step B, the translated request is stored in the buffer circuitry 140 of the PCIe switch 100. The request is buffered while the permission is checked at the root port 230.

In this example, it is assumed that there is no hit for the necessary permissions in the cache 320. Consequently, at a step C, a permission check message is issued to the PCIe root port 230 from the PCIe switch 100. The permission check is a header-only message. As a consequence, the bandwidth consumption is kept low as compared to a situation where a header and body message is transmitted. The PCIe root port 230 checks the requisite permissions with the IOMMU 240.

At step D, a permission response is issued from the PCIe root port 230 to the PCIe switch 100. The response indicates the result of checking the permissions at the IOMMU 240.

In this case, the permission response is that the PCIe device 0 210 does have permission to access the PCIe device 1 220. Consequently, the translated request is forwarded from the buffer circuitry 140 of the PCIe switch 100 to the PCIe device 1 220. The permission response would be stored in the cache for future use. If the permission response had been that no permission was granted, then an error action is taken. This could include the translated request being deleted from the buffer circuitry 140, and may include either the forwarding of the permission response, the forwarding of an error to the PCIe device 0 210, or some other action such as an exception or fault being raised.

In the case of a write request, no further action needs to occur. However, in the case of a read request, a completion packet is issued from the PCIe device 1 220 at step F. The completion packet may contain the data that was requested in the translated request or may indicate that an error has occurred during the read process.

When the completion packet is received by the PCIe switch 100, it can be forwarded directly to the PCIe device 0 210 at step G. This is because, since the translated read request did not pass through the PCIe root port 230, there is no need for the completion packet to be sent to the PCIe root port 230 either. Indeed, the completion packet is able to follow the same path taken by the translated request and can therefore be forwarded directly from the PCIe switch 100 to the PCIe device 0 210 (i.e. without being forwarded to the PCIe root port 230).

In this way, a first bandwidth saving is made as a consequence of the entire translated request not being forwarded to the PCIe root port 230. A second bandwidth saving is made as a consequence of the completion message not being transmitted up to the PCIe root port 230 and back again. Furthermore, a latency saving is made as a consequence of the completion message not being sent to the PCIe device 0 210 via the PCIe root port 230.

FIGS. 3B-3G deal with variants in which the request issued by the PCIe device 0 210 are untranslated. Here, the term "untranslated" refers to an address in which further translation is required. The address could therefore be a virtual address or could be a partial or intermediate address.

Figure 3B:
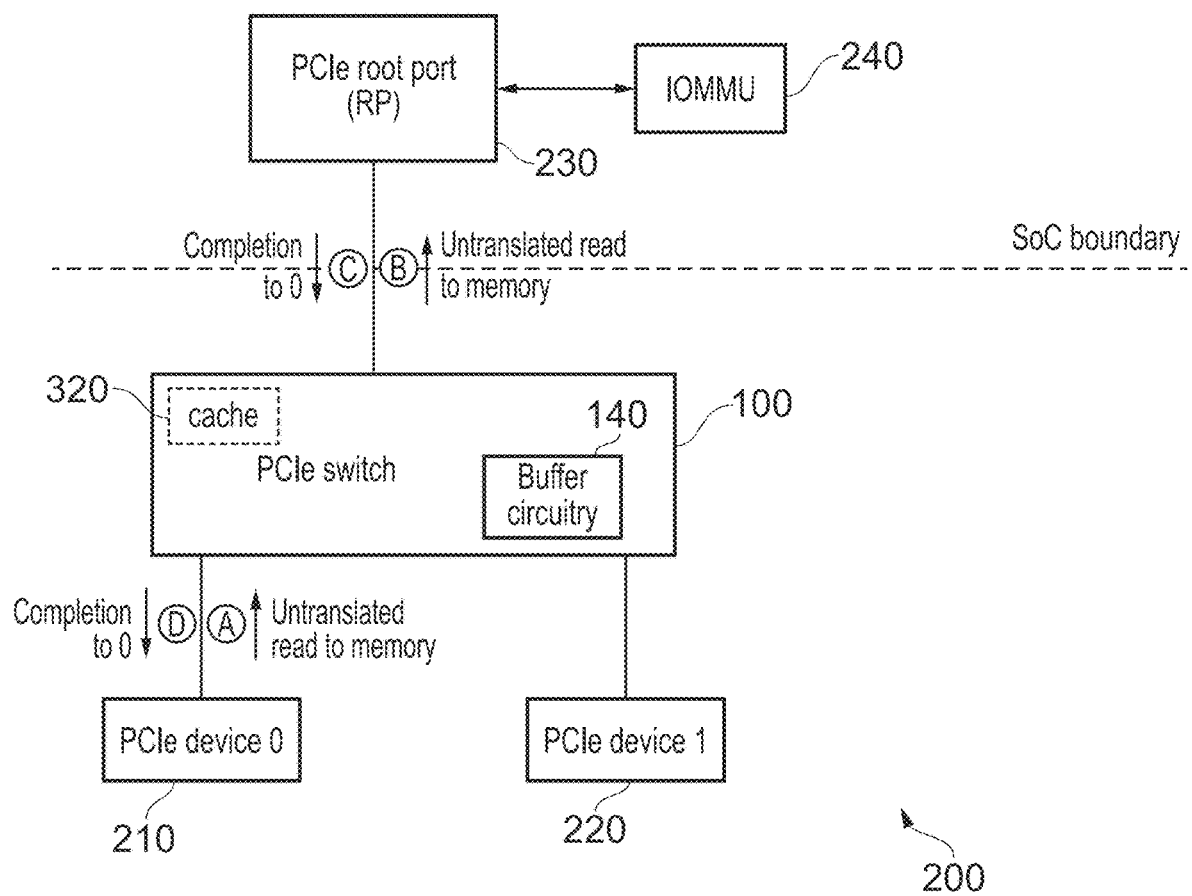
FIG. 3B illustrates an example in which one PCIe device transmits a translated request to another device in the network.

FIG. 3B illustrates an example in which the PCIe device 0 210 issues an untranslated read request to memory. The memory is accessible via the PCIe root port 230.

At step A, the request is issued from the PCIe device 0 210 to the PCIe switch 100. Note that the PCIe switch 100 is not aware at this point that the destination of the request is the main memory because the destination field gives a non-physical address.

As before, it is assumed that the address translation is not available in the cache 320. If the translation is available then the steps B and C, described below, can be skipped.

Since a read request is typically quite small, the PCIe switch 100 issues the read request to the PCIe root port 230 at step B rather than using the buffer circuitry 140. This is because little bandwidth saving is to be had by issuing a separate permission check request to the PCIe root port 230. Once the untranslated request is received by the PCIe root port 230, the IOMMU 240 can be used to perform the address translation and the permission check. At this point, it is determined that the target of the untranslated read request is memory (and permission is granted) and therefore the memory read request is made by the PCIe root port 230.

At a step C, a completion packet is issued by the PCIe root port 230 back to the PCIe switch 100. The completion packet may also include the address translation or an indication that the address referred to memory, which can then be stored in the cache 320 for a future request.

At a step D, the completion packet is forwarded to the PCIe device 0 210.

Figure 3C:
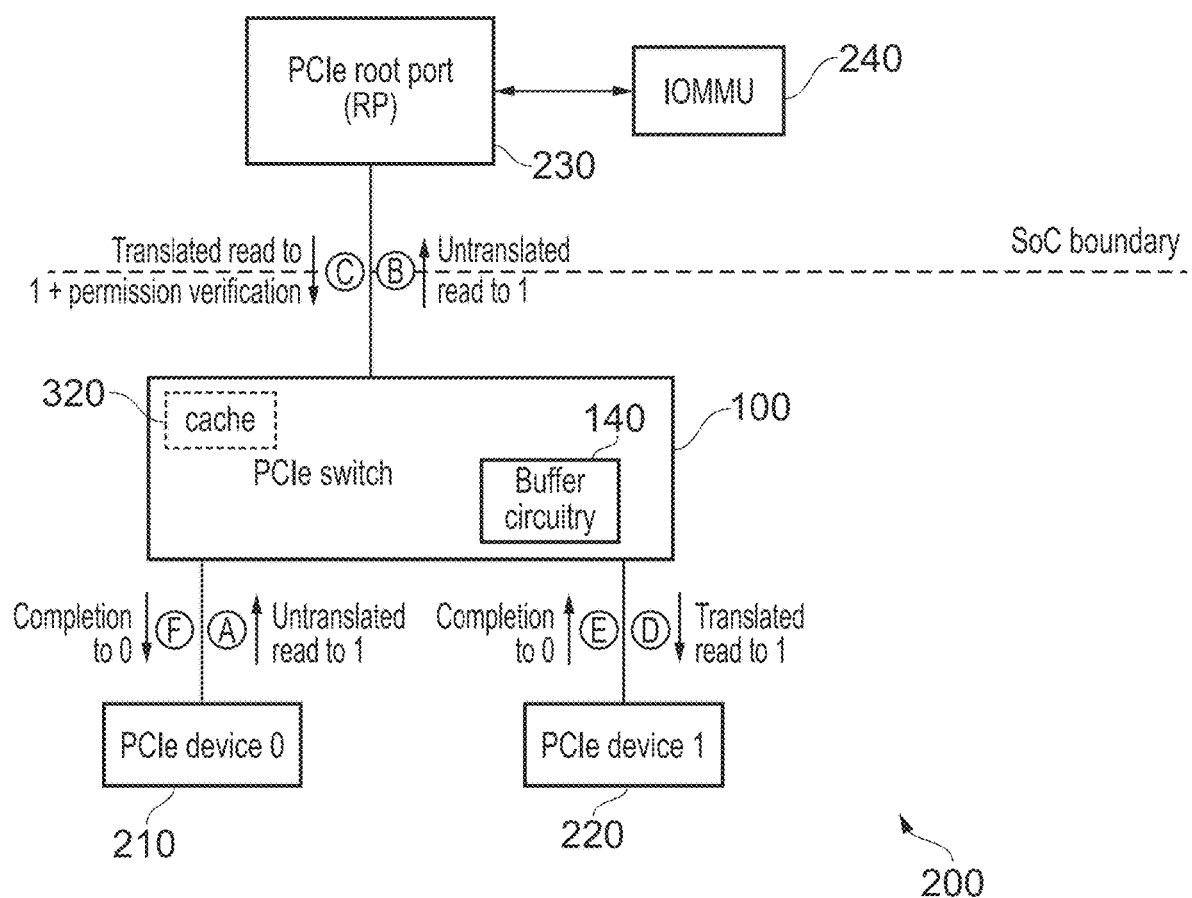
FIG. 3C illustrates an example in which one PCIe device transmits a translated request to another device in the network.

FIG. 3C illustrates a variant in which the untranslated read request is made to PCIe device 1 220. In practice, it is not initially known by the PCIe switch 100 that this is the destination of the untranslated read request.

At step A, the untranslated read request is issued by the PCIe device 0 210 to the PCIe switch 100.

As before, it is assumed that the address translation is not available in the cache 320. If the translation is available then the steps B and C, described below, can be skipped.

From here, at step B, the untranslated read request is issued from the PCIe switch 100 to the PCIe root port 230. Again, the address is translated (and permission is checked) by use of the IOMMU 240. In this case, it is determined that the destination of the read request is the PCIe device 1 220.

Consequently, at step C the now translated read request is sent back to the PCIe switch 100 together with verification of the permission. The verification and the translation are stored in the cache 320 and so can be used later without the root port 320 needing to be contacted.

At step D, the (now) translated read request is sent to the destination PCIe device 1 220. As explained below, the PCIe switch 100 causes the read request to the PCIe device 1 220 to be ordered behind any previous issues write request.

At step E, a completion packet for the read request is issued from the PCIe device 1 220 to the PCIe switch 100, where it is forwarded back to the PCIe device 0 210. Note that in practice, whether the completion packet can pass straight from the PCIe switch 100 to the PCIe device 0 210 as opposed to travelling via the PCIe root port 230 will depend on which write mode is being used (bandwidth-saving or latency-saving) as explained below.

A bandwidth saving is therefore achieved since the completion packet is not transmitted up to the PCIe root port 230. Instead, the completion packet is transmitted directly from the PCIe switch 100 to the PCIe device 0 210. Furthermore, latency can be saved as a consequence of the read request being transmitted in its entirety from the PCIe switch 100 to the PCIe root port 230 at step B. In particular, when the read request is made to a main memory, there is no need for the read request to subsequently be transmitted from the PCIe switch 100 to the PCIe root port 230. Meanwhile, bandwidth is not significantly increased as a consequence of this, since the read request packet is usually small.

FIGS. 3D-3G deal with untranslated write requests. The handling of untranslated write requests can be controlled via mode circuitry 300. In particular, the mode circuitry 300 can be used to place the PCIe switch into either a bandwidth-saving mode or a latency-saving mode as required. The system may be such that the mode of the PCIe switch 100 can be changed dynamically as required. In the bandwidth-saving mode, the PCIe switch 100 attempts to take actions such that the bandwidth used in communication between the PCIe switch 100 and the PCIe root port 230 is kept low. Meanwhile, the latency-saving mode aims to reduce the overall latency of responding to a request issued by the PCIe device 0 210.

Figure 3D:
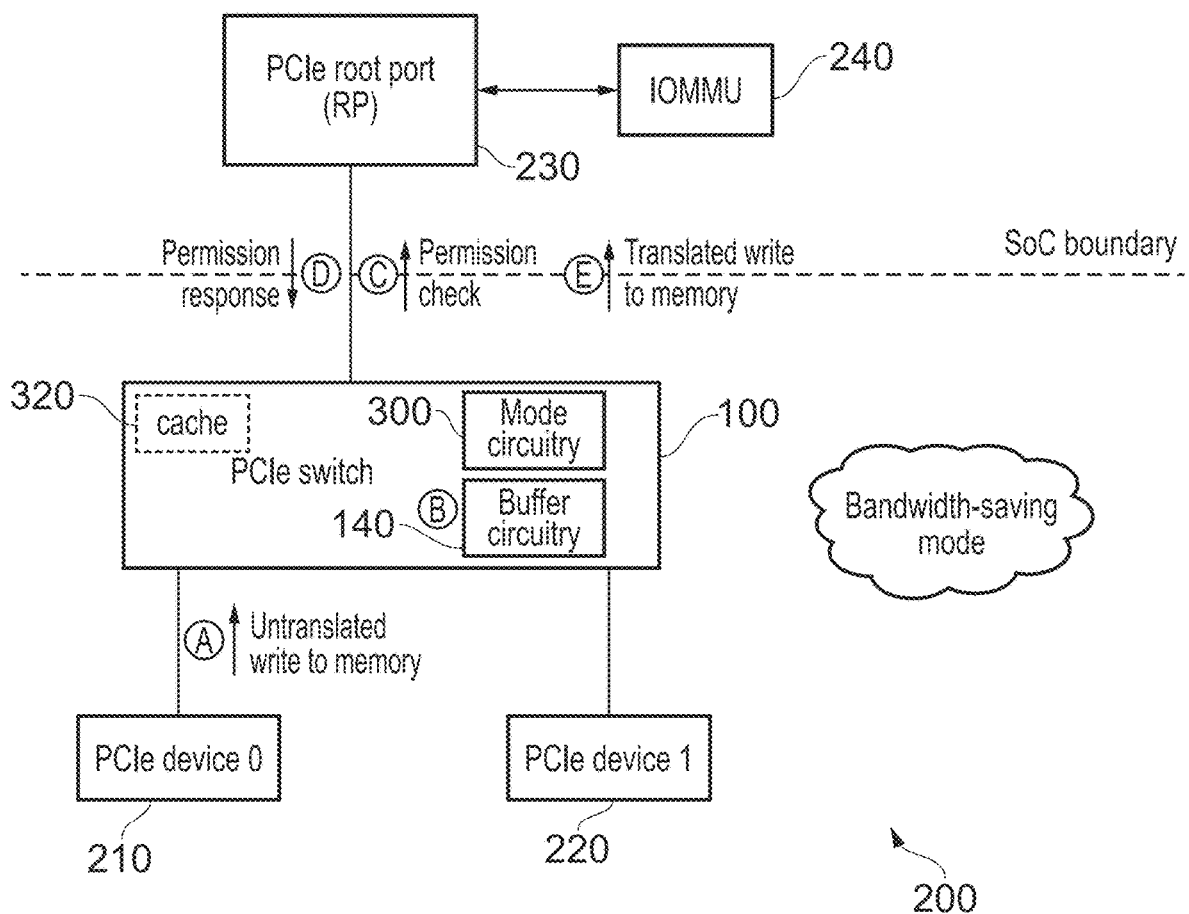
FIG. 3D illustrates an example in which one PCIe device transmits a translated request to another device in the network.

FIG. 3D illustrates the behaviour of the system when the PCIe switch 100 is in a bandwidth-saving mode and an untranslated write to memory is issued by the PCIe device 0 210. As before, the fact that the untranslated write is to memory is not initially known by the PCIe switch 100, since the address is not translated.

At a step A, the untranslated write to memory is issued from the PCIe device 0 210 to the PCIe switch 100.

At step B, the request is buffered in buffer circuitry 140.

As before, it is assumed that the address translation is not available in the cache 320. If the translation is available then the steps C and D, described below, can be skipped.

At step C, a translation and permission check request packet is issued from the PCIe switch 100 to the PCIe root port 230. The PCIe root port 230 then uses the IOMMU 240 to translate the address. This makes it possible to know that the destination of the write request is main memory, which is accessed by the PCIe root port 230.

At step D, the PCIe root port 230 issues a response. The response includes the translated address (or at least an indication that the write request is to be forwarded to the PCIe root port 230) and also indicates that permission is granted. Note that, as with other scenarios shown here, the permission could be implicit from the fact that a translation has been provided. The permission response and the translation (or an indication of the translation) can be stored in the cache 320 for later use.

At step E, the (now translated) write request is transmitted back to the PCIe root port 230. The PCIe root port 230 is then responsible for forwarding the write request to memory.

Figure 3E:
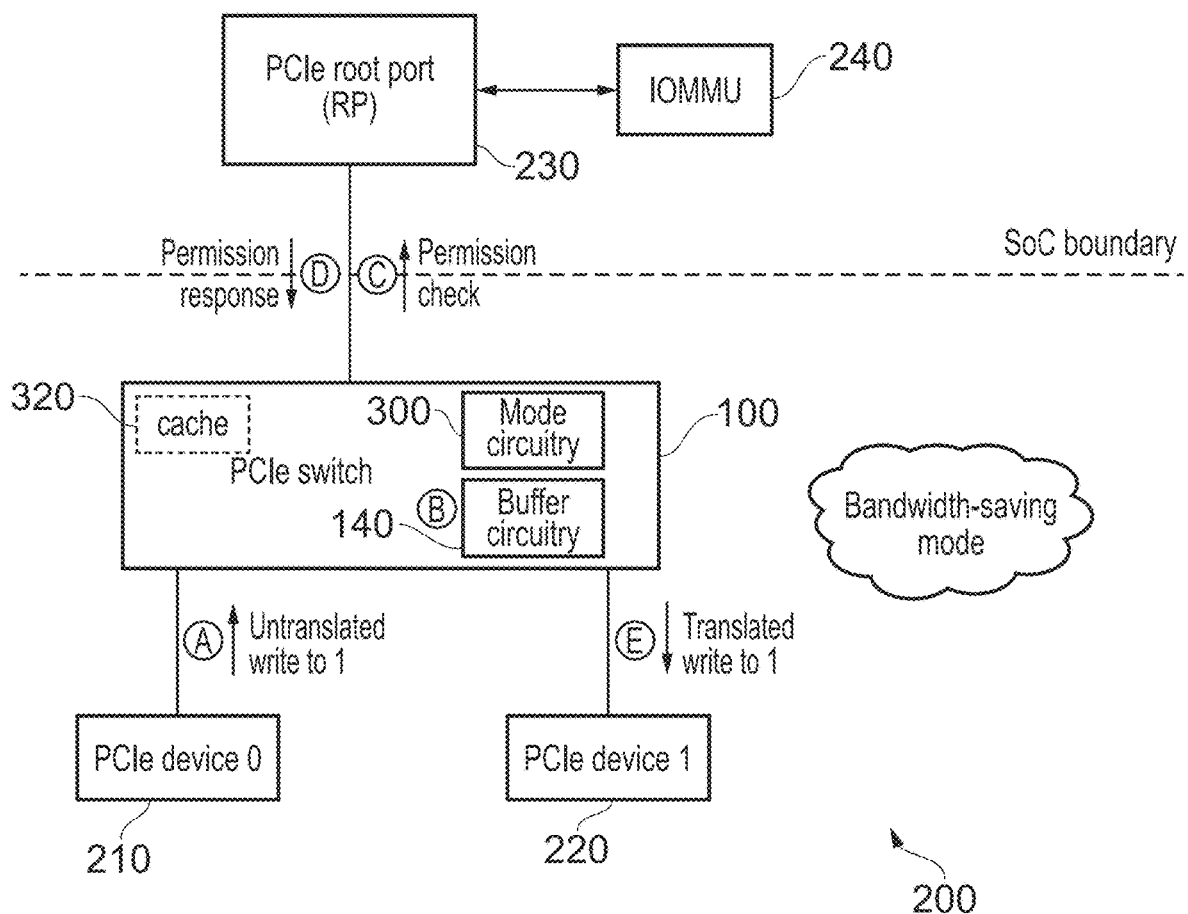
FIG. 3E illustrates an example in which one PCIe device transmits a translated request to another device in the network.

FIG. 3E illustrates an example in which an untranslated write request is made to PCIe device 1 220. In this example, steps A, B, and C follow the same process as illustrated with respect to FIG. 3D (as before, it is assumed that the cache 320 does not have the requisite information). At step C, the PCIe root port 230 determines that the untranslated address refers to the PCIe device 1 220.

At step D, the PCIe root port 230 issues a response to the PCIe switch 100. The response includes the translated address, and also an indication that the PCIe device 0 210 is permitted to access the PCIe device 1 220. At least part of this response is cached by the cache 320.

At step E, the (now translated) write request stored in the buffer circuitry 140 is issued to the PCIe device 1 220.

It will therefore be appreciated that in the examples of FIGS. 3D and 3E, bandwidth is saved as a consequence of the link between the PCIe switch 100 and the PCIe root port 230 being used to transmit the entirety of the write request only where this is necessary (e.g. for the write request to be made to memory). As illustrated in the example of FIG. 3D, this results in a situation in which an initial permission check is issued from the PCIe switch 100 (e.g. using a header-only message) and in response to determining that the untranslated address refers to main memory, a further communication from the PCIe switch 100 to the PCIe root port 230 containing the write request is then performed.

Figure 3F:
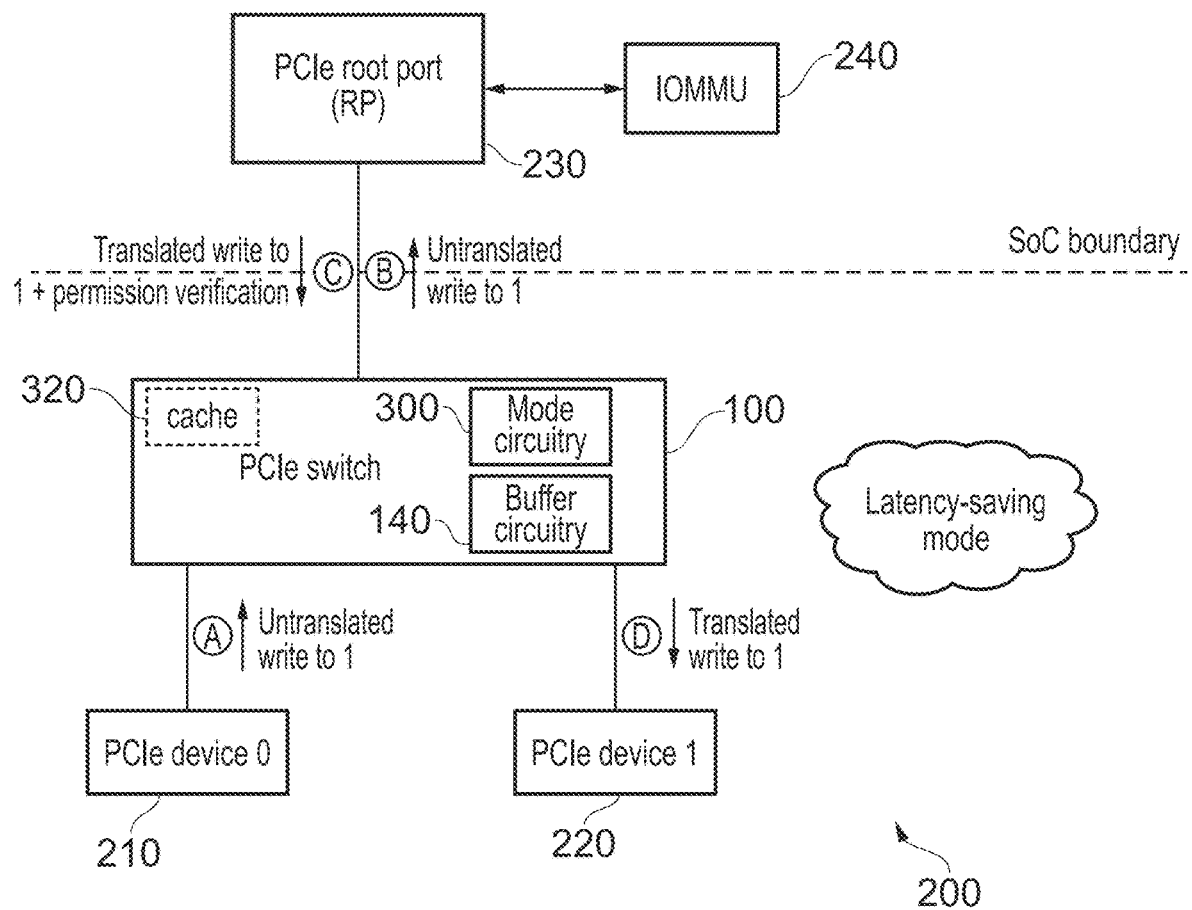
FIG. 3F illustrates an example in which one PCIe device transmits a translated request to another device in the network.
Figure 3G:
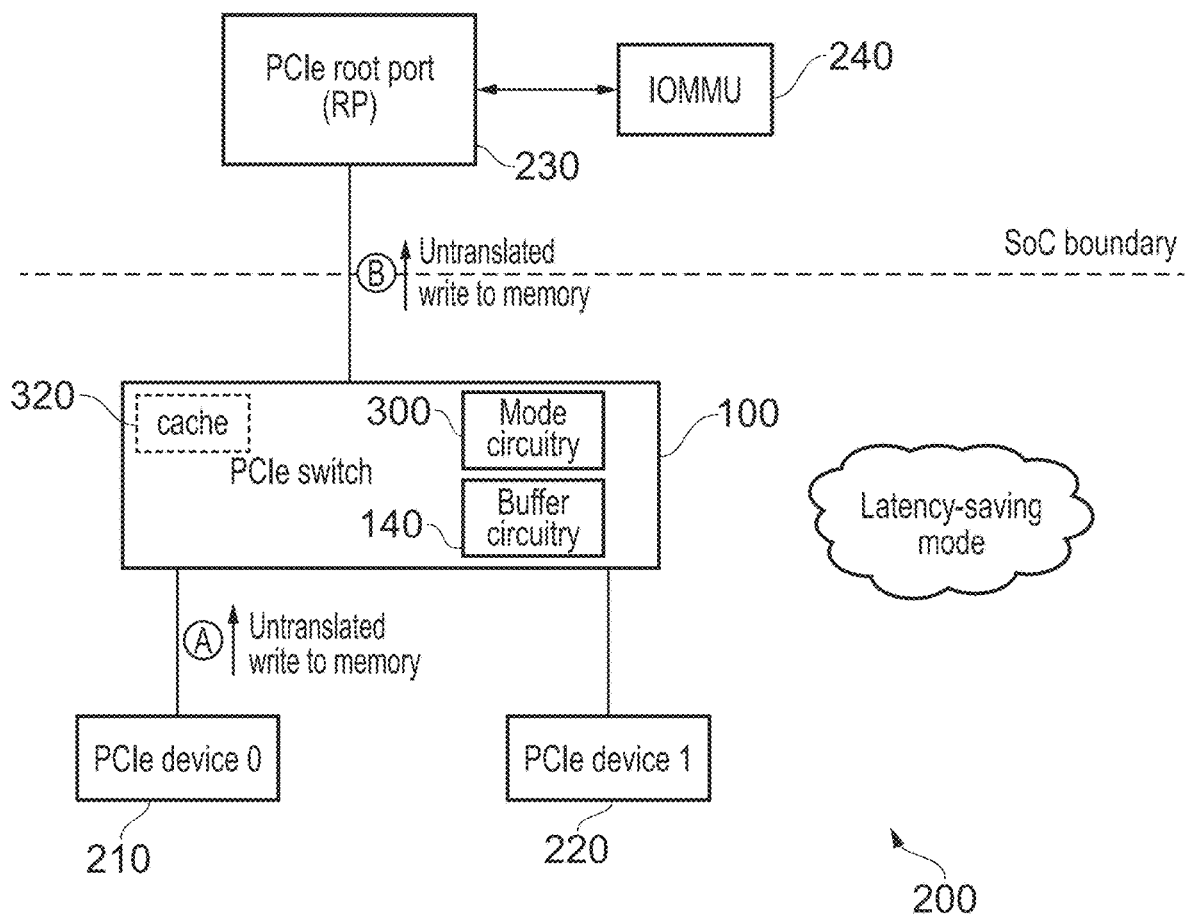
FIG. 3G illustrates an example in which one PCIe device transmits a translated request to another device in the network.

FIGS. 3F and 3G illustrate the latency-saving mode.

As a step A, an untranslated write request to PCIe device 1 220 is issued from the PCIe device 0 210 to the PCIe switch 100. As before, it is not known by the PCIe switch 100 at this time that the untranslated write request is being made to the PCIe device 1 220.

As before, it is assumed that the address translation is not available in the cache 320. If the translation is available then the steps B and C, described below, can be skipped.

At step B, the untranslated write request is issued to the PCIe root port 230. Here, the PCIe root port 230 uses the IOMMU 240 to convert the untranslated write request to a translated write request. In addition, the PCIe root port 230 is able to determine that the PCIe device 0 210 has permission to access the PCIe device 1 220.

At step C, since the write request is made to PCIe device 1 220, which is accessible through the PCIe switch 100, the translated write request and the permission verification are transmitted back to the PCIe switch 100. Note that as before, the permission verification could be implicit from the sending of the translated write request rather than an error notification. An indication of the translation and permissions is stored in the cache 320.

At step D, the translated write request is issued from the PCIe switch 100 to the PCIe device 1 220.

In FIG. 3G, the write request that is made by the PCIe device 0 210 is a write request to main memory. Steps A and B proceed in the same way as for FIG. 3F (again assuming that the required data does not hit in the cache 320). However, when the PCIe root port 230 receives the untranslated write request and determines, via the IOMMU 240, that the write request is to main memory (which is handled via the PCIe root port 230) the write request can be handled immediately. In this case, a response could be sent back from the PCIe root port 230 to the PCIe switch 100 to indicate this fact, which can then be stored in the cache 320. Alternatively, the absence of any further communication could be used as an implicit indication that the address referred to main memory, and this could be stored in the cache 320. A still further alternative is that no action is taken. Since the default behaviour, when no translation is available, is to forward the write request to the root port (which happens to be the correct destination in this case), one could save capacity of the cache 320 by simply storing nothing in respect of requests that are intended to end up at the root port 230 (e.g. those being sent to main memory).

It will therefore be appreciated that in the latency-saving mode, latency is saved as a consequence of it not being necessary for a further communication to be transmitted from the PCIe switch 100 to the PCIe root port 230 in the case of a write request to main memory. However, as illustrated in FIG. 3F, where the write request transpires to be to a PCIe device that is connected via the PCIe switch 100, bandwidth usage is higher as a consequence of the full write request being unnecessarily transmitted to the PCIe root port 230 and back again.

As mentioned above, the selection of bandwidth-saving mode or latency-saving mode can have an effect on the path taken for the completion packets. Due to ordering restrictions, if latency-saving mode is used, (and therefore if writes are sent to the PCIe root port 230) then read completions are also sent through the PCIe root port 230 because read completions cannot overtake previously issued writes from the same device at any point unless the completions have relaxed ordering enabled. In bandwidth-saving mode, completions can be forwarded from one device 220 to another 210 directly by the PCIe switch 100, provided, for instance, a completion from PCIe device 1 220 to PCIe device 210 does not overtake a write from PCIe device 1 220 to PCIe device 0 210.

Figure 4:
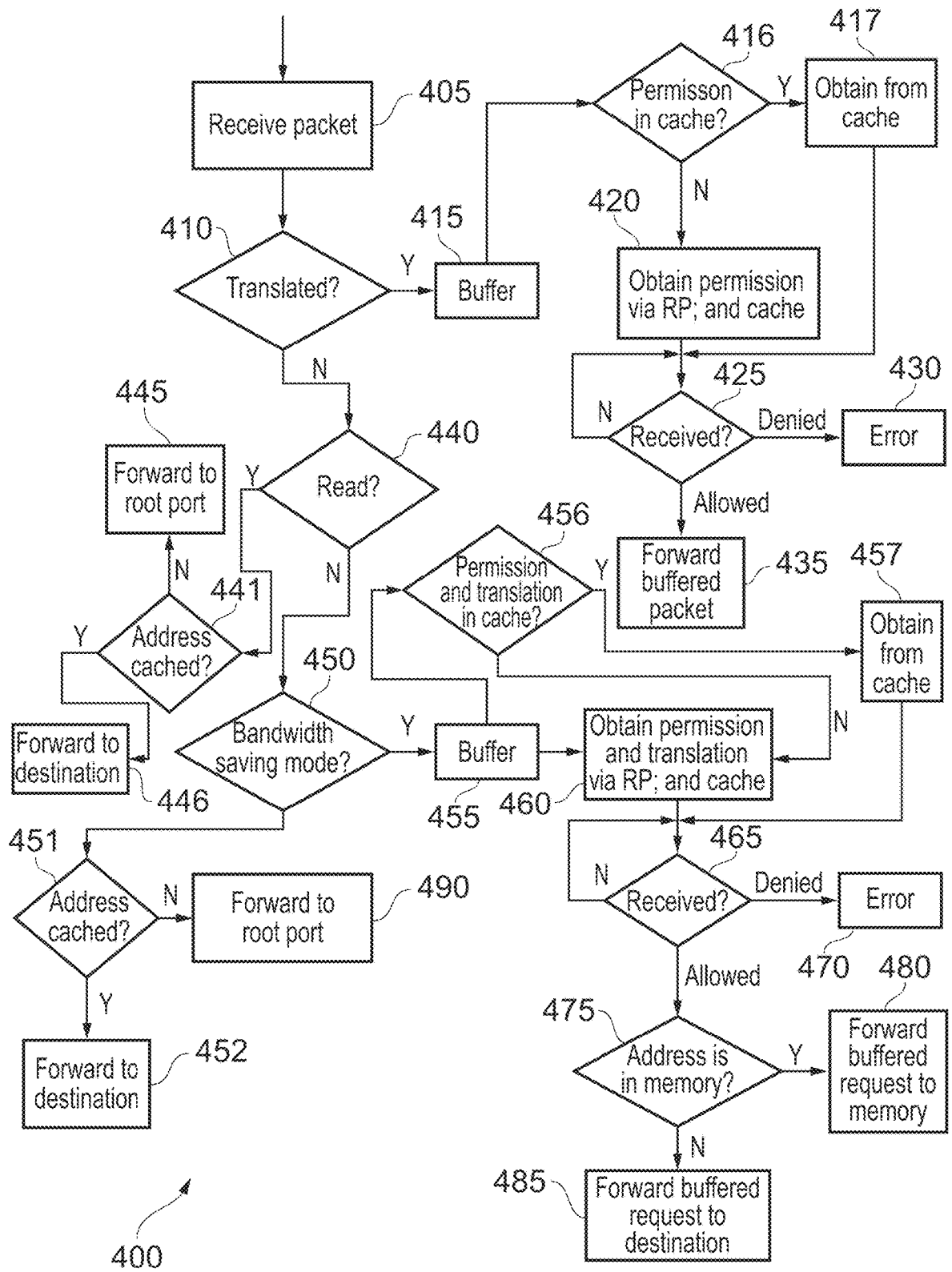
FIG. 4 illustrates a flowchart that shows the behaviour of the PCIe switch.

FIG. 4 illustrates a flowchart 400 that shows the behaviour of the PCIe switch 100. At step 405, a packet is received (e.g. from a PCIe device 0 210). At step 410, it is determined whether a destination address of the packet has been translated or not. If the destination address has been translated and the PCIe switch 100 is therefore able to determine the destination, then at step 415, the packet is buffered in the buffer circuitry 140. Then, at step 416, it is determined whether permission is present in the cache 320. If so, then at step 420 the permission is obtained from the cache in step 417, the result is stored in a local cache, and the process proceeds to step 425. Otherwise, permission is obtained via the PCIe root port 230. As previously explained, this can be achieved by a header-only message that is transmitted to the PCIe root port 232 check the permission via the IOMMU 240. Step 425 waits until a response to the permission check is received. If permission is denied, then an error occurs at step 430. As previous explained, this could cause an exception or fault to be raised or could result in a denial message being transmitted back to the PCIe device 0 210. Otherwise, at step 435, the permission is given and so the buffered message is extracted from the buffer circuitry 140 and issued to the PCIe device 1 220.

If, at step 410, the address is not translated, then at step 440 it is determined whether the request is a read request. If so, then at step 44, it is determined whether the translation is stored in a local cache. If not, then at step 445, the read request is forwarded to the PCIe root port 230. From there, the PCIe root port 230 will forward the read request appropriately. In the case of main memory, the PCIe root port 230 will forward the request to memory. In the case of a PCIe device that is accessed via the PCIe switch 100, the root port will forward the request back to the PCIe switch 100. The further steps of forwarding the message is not illustrated in the flowchart 400 since this relates to simple packet forwarding. If the address is cached, then at step 446, the request can be forwarded straight to the destination.

If the request is not a read request at step 440, then the request is a write request. At step 450, it is determined whether the system is operating in bandwidth-saving mode. If not, then the system is operating in latency-saving mode. Therefore, at step 451, it is determined whether the address to which the request is directed is stored locally (e.g. in the cache 320). If so, then the request is forwarded to its destination 452. Otherwise, the request is forwarded to the PCIe root port 230 to perform the address translation. From there, the PCIe root port will then forward the translated write request as necessary. Once again, the PCIe switch 100 may be involved in further routing of the message. However this is not illustrated in the flowchart 400.

If, at step 450, the system is in a bandwidth-saving mode, then at step 455, the packet is buffered. At step 456, it is determined whether the permission and address translation are present in the local cache 320. If so, then the address and translation are obtained from the cache at step 457 and the process proceeds to step 465. Otherwise, at step 460, permission and address translation are obtained via the PCIe root port 230 and the result is stored in a local cache. As before, this can be achieved by issuing a header-only message to the PCIe root port 230. Step 465 waits until a response is received. If permission is not obtained, then at step 470, an error condition occurs (e.g. a fault or exception). Otherwise, at step 475, it is determined whether the translated address is an address in the main memory. If so, at step 480 the buffered request is forwarded to the PCIe root port 232 forward to the main memory system. Otherwise, at step 485, the PCIe switch 100 forwards the buffered request to the destination device as indicated by the physical address.

Accordingly, through the above techniques, it can be seen that bandwidth and or latency can be reduced in a PCIe system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
communication circuitry configured to receive, from an origin Peripheral Component Interconnect Express (PCIe) device, a translated PCIe packet comprising a destination field that comprises a physical address of a destination PCIe device;
permission circuitry configured to transmit a permission check packet, separate from the translated PCIe packet, to a root port to determine whether the origin PCIe device has permission to access the destination PCIe device; and
buffer circuitry configured to store the translated PCIe packet until a response to the permission check packet is received.

2. The data processing apparatus according to claim 1, wherein
the translated PCIe packet is not transmitted to the root port.

3. The data processing apparatus according to claim 1, wherein
the permission check packet is bodyless.

4. The data processing apparatus according to claim 1, wherein
the root port has access to a Memory Management Unit to determine whether the origin PCIe device has permission to access the destination PCIe device based on the physical address.

5. The data processing apparatus according to claim 1, wherein
when the communication circuitry receives a response to the permission check packet:
if the response indicates that the origin PCIe device has permission to access the destination PCIe device, then the buffer circuitry releases the translated PCIe packet to the destination PCIe device,
otherwise an error is raised.

6. The data processing apparatus according to claim 1, wherein
the communication circuitry is configured, when the communication circuitry receives a completion packet from the destination PCIe device in response to the translated PCIe packet being released to the destination PCIe device, to forward the completion packet to the origin PCIe device avoiding the root port.

7. The data processing apparatus according to claim 1, wherein
the translated PCIe packet is sent in accordance with a PCIe peer-to-peer protocol.

8. The data processing apparatus according to claim 1, wherein
the communication circuitry is configured to receive, from the origin Peripheral Component Interconnect Express (PCIe) device, an untranslated PCIe packet comprising a destination field that comprises a virtual address or intermediate physical address of a destination device; and
in response to the untranslated PCIe packet, the communication circuitry is configured to transmit a translation request packet for the virtual address or intermediate physical address from the root port and to transmit a second permission check packet to the root port to determine whether the origin PCIe device has permission to access the destination device.

9. The data processing apparatus according to claim 8, wherein
the communication circuitry is configured, when the untranslated PCIe packet is a read request, to transmit the translation request packet and the second permission check packet by forwarding the untranslated PCIe packet to the root port.

10. The data processing apparatus according to claim 8, comprising:
mode circuitry to control an operating mode of the data processing apparatus between a bandwidth-saving mode and a latency-saving mode.

11. The data processing apparatus according to claim 10, wherein
the communication circuitry is configured, when the untranslated PCIe packet is a write request and the operating mode of the data processing apparatus is the latency-saving mode, to transmit the translation request packet and the second permission check packet by forwarding the untranslated PCIe packet to the root port.

12. The data processing apparatus according to claim 10, wherein
the communication circuitry is configured, when the untranslated PCIe packet is a write request and the operating mode of the data processing apparatus is the bandwidth-saving mode, to:
transmit the translation request packet and the second permission check packet, both separate to the untranslated PCIe packet, to the root port to determine whether the origin PCIe device has permission to access the destination device and to obtain an a translation of the virtual address or intermediate physical address, and
cause the buffer circuitry to store the untranslated PCIe packet until a response to the translation request packet and the second permission check packet is received.

13. The data processing apparatus according to claim 12, wherein
the translation request packet and the second permission check packet are bodyless.

14. The data processing apparatus according to claim 12, wherein
when the communication circuitry receives at least one response to the translation request packet and the second permission check packet:
if the at least one response indicates that the origin PCIe device has permission to access the destination device, then the buffer circuitry releases the untranslated PCIe packet to the destination device based on the translation of the virtual address or intermediate physical address,
otherwise an error is raised.

15. The data processing apparatus according to claim 14, wherein
when the destination device is a main memory, the buffer circuitry releases the translated PCIe packet to the root port; and
when the destination device is the destination PCIe device, the buffer circuitry releases the translated PCIe packet to the destination PCIe device.

16. The data processing apparatus according to claim 1, comprising:
cache circuitry configured to cache the response to the permission check packet and to provide the response to the permission check when a later permission check corresponding to the permission check is to be performed.

17. The data processing apparatus according to claim 16, wherein
the communication circuitry is configured to receive, from the origin Peripheral Component Interconnect Express (PCIe) device, an untranslated PCIe packet comprising a destination field that comprises a virtual address or intermediate physical address of a destination device; and
the cache circuitry is configured to store a physical address corresponding to the virtual address or intermediate physical address of the destination device.

18. A data processing method comprising:
receiving, from an origin Peripheral Component Interconnect Express (PCIe) device, a translated PCIe packet comprising a destination field that comprises a physical address of a destination PCIe device;
transmitting a permission check packet, separate from the translated PCIe packet, to a root port to determine whether the origin PCIe device has permission to access the destination PCIe device; and
storing the translated PCIe packet until a response to the permission check packet is received.

19. A non-transitory computer-readable medium to store computer-readable code for fabrication of a data processing apparatus comprising:
communication circuitry configured to receive, from an origin Peripheral Component Interconnect Express (PCIe) device, a translated PCIe packet comprising a destination field that comprises a physical address of a destination PCIe device;
permission circuitry configured to transmit a permission check packet, separate from the translated PCIe packet, to a root port to determine whether the origin PCIe device has permission to access the destination PCIe device; and
buffer circuitry configured to store the translated PCIe packet until a response to the permission check packet is received.

* * * * *